United States Patent
Bennett (10) Patent No.: US 7,402,012 B2
(45) Date of Patent: Jul. 22, 2008

(54) MONO-BEAM MOTORCYCLE TRAILER AND SUPPORT ASSEMBLY

(76) Inventor: Mark D. Bennett, 266 El Rancho Rd., Kalispell, MT (US) 59901

(*) Notice: Subject to any disclaimer, the term of this patent is extended or adjusted under 35 U.S.C. 154(b) by 131 days.

(21) Appl. No.: 11/526,286

(22) Filed: Sep. 25, 2006

(65) Prior Publication Data

US 2008/0073881 A1    Mar. 27, 2008

(51) Int. Cl.
*B60P 3/07* (2006.01)
*B60P 7/08* (2006.01)

(52) U.S. Cl. .......................... 410/3; 280/494; 410/7; 410/19

(58) Field of Classification Search .......... 280/400, 280/402, 291, 494, 656, 789; 410/2–4, 7, 410/9, 19, 22
See application file for complete search history.

(56) References Cited

U.S. PATENT DOCUMENTS

| | | | | |
|---|---|---|---|---|
| 3,753,579 A | * | 8/1973 | Kurilich, Jr. | 280/400 |
| 5,697,629 A | * | 12/1997 | Guild | 280/402 |
| 5,749,685 A | * | 5/1998 | Hain | 410/7 |
| 6,802,493 B2 | * | 10/2004 | Lance | 254/131 |
| D523,779 S | * | 6/2006 | Mattila | D12/101 |
| 7,114,896 B2 | * | 10/2006 | Lantrip | 410/7 |
| 7,198,443 B2 | * | 4/2007 | Macomber, III | 410/7 |
| 2008/0042403 A1 | * | 2/2008 | Anderson | 280/656 |

* cited by examiner

*Primary Examiner*—Anne Marie Boehler
(74) *Attorney, Agent, or Firm*—Bergman & Jeckle, PLLC (57) ABSTRACT

A mono-beam trailer and support assembly for transporting a motorcycle in an upright position without the use of straps or ropes. A single elongate main beam, upon which the motorcycle is carried, pivots vertically and laterally relative to the towing vehicle but cannot rotate axially. A "T" bar assembly pivotally carried by the main beam releasably communicates with replacement foot peg pins installed on the motorcycle foot peg fastening brackets releasably securing the motorcycle to the main beam and preventing undesirable movement thereof. A pivotal swing arm at a rearward end portion of the main beam has a wheel truck thereon for towable movement of the trailer. The swing arm may be pivoted vertically and laterally on to mutually perpendicular axles to a position adjacent the elongate main beam to ease the loading and unloading of the motorcycle.

7 Claims, 5 Drawing Sheets

MONO-BEAM MOTORCYCLE TRAILER AND SUPPORT ASSEMBLY

II. BACKGROUND OF INVENTION

1. IIA. Related Applications

There are no applications related hereto heretofore filed in this or in any foreign country.

2. IIB. Field of Invention

This invention relates to land vehicle carriers, and more particularly to a motorcycle trailer having a single elongate beam for carriage of an upright motorcycle thereon.

IIC. BACKGROUND AND DESCRIPTION OF PRIOR ART

Motorcycles that cannot be legally ridden on streets, roads and highways must be transported to riding areas such as Off Road Vehicle (ORV) parks, or other areas where motorcycle riding is permitted by another vehicle. In addition, operators may need to transport otherwise street legal motorcycles from location to location without riding them, such as to transport a motorcycle to a repair facility. Trailers are a common transport means for motorcycles.

Prior art discloses single and multi-wheel motorcycle trailers having a variety of means for carrying, loading, unloading and securing a motorcycle upon the trailer. Commonly motorcycle trailers have a planar deck, or plural channel-type rails, to support the motorcycle which is secured upon the trailer with plural elongate tie down straps. The tie down straps operatively communicate between the motorcycle and trailer and hold the motorcycle suspension in a compressed state to keep the motorcycle upright during transport. Typically an elongate ramp, such as a length of board, is used for loading the motorcycle onto the trailer and unloading the motorcycle from the trailer.

Unfortunately, most trailers have drawbacks that make ownership and use inconvenient and expensive. Trailers are typically heavy, unsightly, difficult to maneuver, and require lots of space to store when not in use. Further, many municipalities, homeowner's associations and the like have regulations and covenants that prohibit the parking and storage of trailers on the street, in driveways, or where the trailer is visible from public areas. Such regulations and covenants further increase the inconvenience and expense of trailers because the trailer must be stored offsite, inside a building such as a garage, or behind a fence. Additionally, compressing the motorcycle suspension with tie down straps, which is a common method of securing a motorcycle to a trailer, for the duration of the transport may damage the motorcycle resulting in increased maintenance, and elongate ramps are dangerous as the motorcycle may slide laterally off or down the ramp during loading and unloading. Further, tie down straps, ropes and ramp may be forgotten, lost or stolen when the trailer is unattended, such as when the operator is riding the motorcycle.

The present invention seeks to overcome these and other drawbacks to known motorcycle trailers by providing a motorcycle trailer that is small, lightweight, easily storable, carries and supports an upright motorcycle thereon without any external straps or ropes that compress the motorcycle suspension, and a motorcycle trailer that may be loaded and unloaded without a ramp.

My invention does not reside in any single one of the identified features individually but rather in the synergistic combination of all of its structures, which give rise to the functions necessarily flowing therefrom as hereinafter claimed.

III. SUMMARY

My mono-beam motorcycle trailer and support assembly generally provides a pair of replacement foot peg pins installed on the motorcycle, an elongate main beam carrying a "T" bar assembly at a medial portion and a pivotal swing arm having a wheel truck at a rearward end portion of the main beam.

In providing such a motorcycle trailer and support assembly it is:

a principal object to provide a mono-beam motorcycle trailer for carriage and support of an upright motorcycle without use of external straps or ropes and without compressing the motorcycle suspension.

a further object is to provide such a motorcycle trailer that is compact so that it may be easily and conveniently stored.

a further object is to provide such a motorcycle trailer that may be towed by a vehicle other than a truck.

a further object is to provide such a motorcycle trailer that may be loaded and unloaded without a ramp.

a further object is to provide such a motorcycle trailer having a swing arm that may be pivoted so that a rearward end portion of the elongate main beam rests upon the supporting surface to aid in loading and unloading of a motorcycle.

a still further object is to provide such a motorcycle trailer that is new and novel in design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

IV. BRIEF DESCRIPTIONS OF DRAWINGS

In the accompanying drawings which form a part hereof and wherein like numbers refer to similar parts throughout.

V. DESCRIPTION OF PREFERRED EMBODIMENT

As used herein, the term "forward", its derivatives, and grammatical equivalents refers to the portion of the trailer that is closest to a towing vehicle. The term "rearward", its derivatives, and grammatical equivalents refers to the portion of the trailer most distant from the towing vehicle. The term "outer", its derivatives, and grammatical equivalents refers to the driver side or passenger side of the trailer as opposed to the laterally medial portion of the trailer.

My mono-beam motorcycle trailer and support assembly generally provides an elongate main beam 10 for carriage of an upright motorcycle thereon, replacement foot peg pins 28 for the motorcycle to be carried, a "T" bar assembly 20 pivotally carried by the main beam 10 that releasably communicates with the replacement foot peg pins 28 installed on the motorcycle, and a pivotal swing arm 30 at a rearward end portion 10b of the main beam 10.

Figure 1:
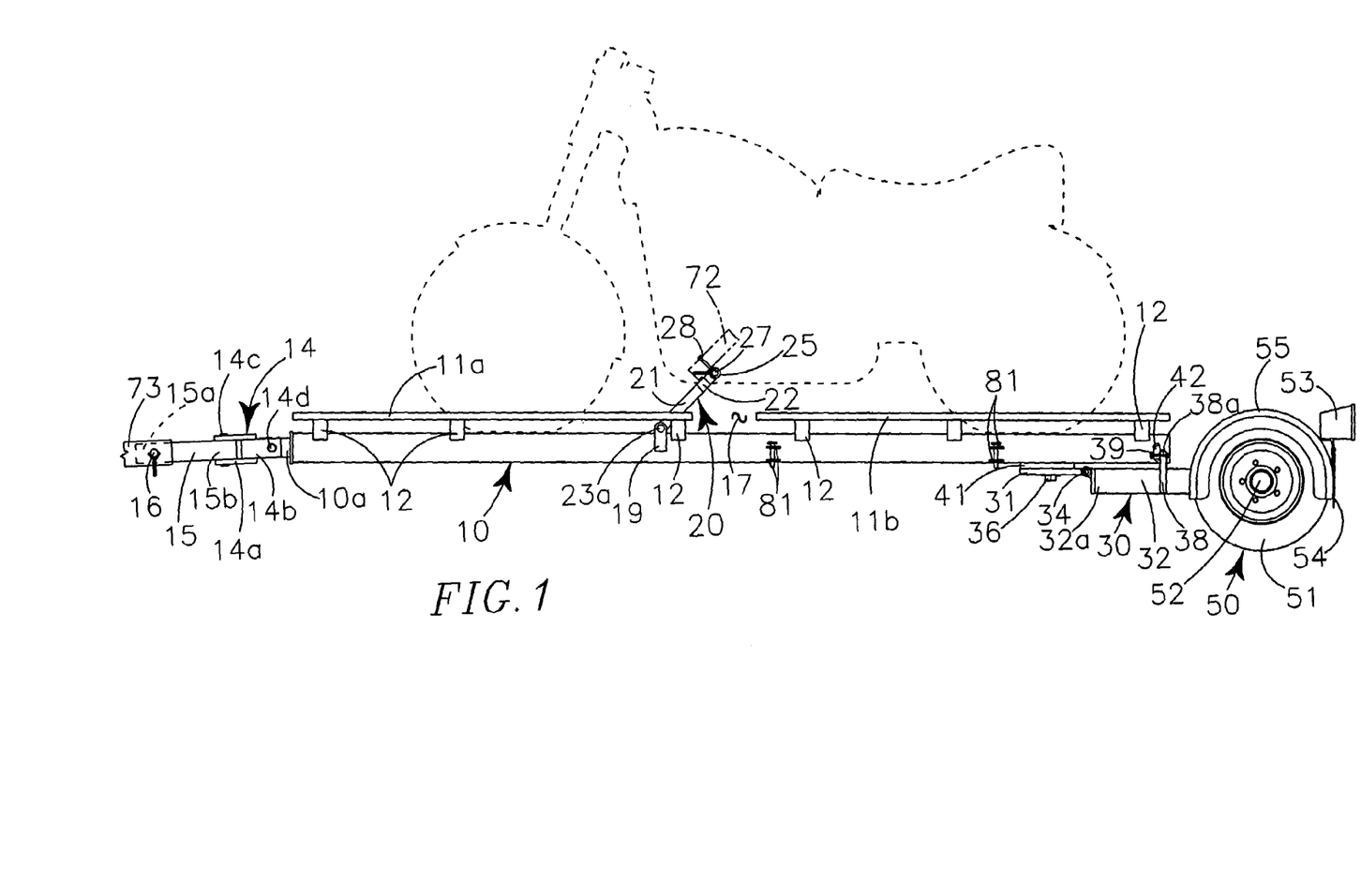
FIG. 1 is an orthographic left side view of my mono-beam motorcycle trailer carrying a motorcycle, shown in phantom outline.

As generically shown in FIG. 1, my trailer and support assembly is releasably attachable to a receiver type towing hitch 73 carried at a rearward end portion of a towing vehicle (not shown). A forward end portion 15a of a box beam receiver tongue 15 is inserted into a box beam channel (not shown) defined by the receiver hitch 73 and is secured in place by a locking pin 16 extending transversely through aligned holes (not shown) defined in the towing hitch 73 and the receiver tongue 15. The box beam configuration of the receiver tongue 15 and the medial channel (not shown) of the receiver hitch 73 cooperate with the locking pin 16 to prevent axial rotation of the receiver tongue 15 relative to the towing hitch 73.

A universal joint 14 is carried at a rearward end portion 15b of the receiver tongue 15 and pivotally interconnects the receiver tongue 15 to a forward end portion 10a of the elongate main beam 10. The universal joint 14 has a forward yoke 14a and a structurally connected opposing rearward yoke 14b. The forward yoke 14a and the rearward yoke 14b are each formed of two parallel spaced apart rectilinear plates structurally interconnected at medial adjoining edge portions (FIG. 1). A bolt type vertical axle 14c and a bolt type horizontal axle 14d each extending through and between aligned holes (not shown) defined in the parallel spaced apart plates of the yokes 14a, 14b allow the main beam 10 to pivot horizontally and vertically, respectively, relative to the receiver tongue 15 but prevent the main beam 10 from rotating axially relative to the receiver tongue 15.

The main beam 10 is a box beam having a forward end portion 10a and a rearward end portion 10b. Forward side rails 11a and rearward side rails 11b extend along each side of the main beam 10 forming a channel 13 (FIG. 5) therebetween to assist in the loading and unloading of a motorcycle onto a top surface 10c of the main beam 10 and to positionally maintain the motorcycle thereon. The side rails 11a, 11b are structurally connected to the main beam 10 by plural "L" shaped side rail supports 12 that carry the side rails 11a, 11b spacedly adjacent laterally and spacedly adjacent above the main beam 10. A gap 17 (FIG. 1), separates the forward side rail 11a from the rearward side rail 11b on each side of the main beam 10 and allows a crossbeam 22 of the "T" bar assembly 20 to pass therethrough so that the "T" bar assembly 20 may pivot downwardly so as to not impede passage of the motorcycle wheels and tires thereover, during loading and unloading.

Figure 3:
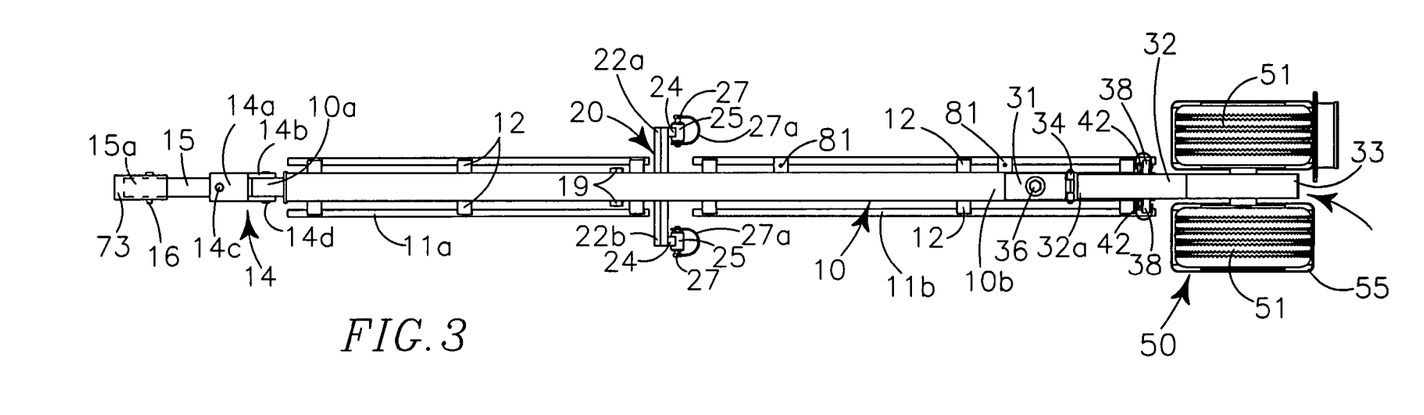
FIG. 3 is a bottom view of the trailer of FIG. 2.
Figures 7, 8, 9:
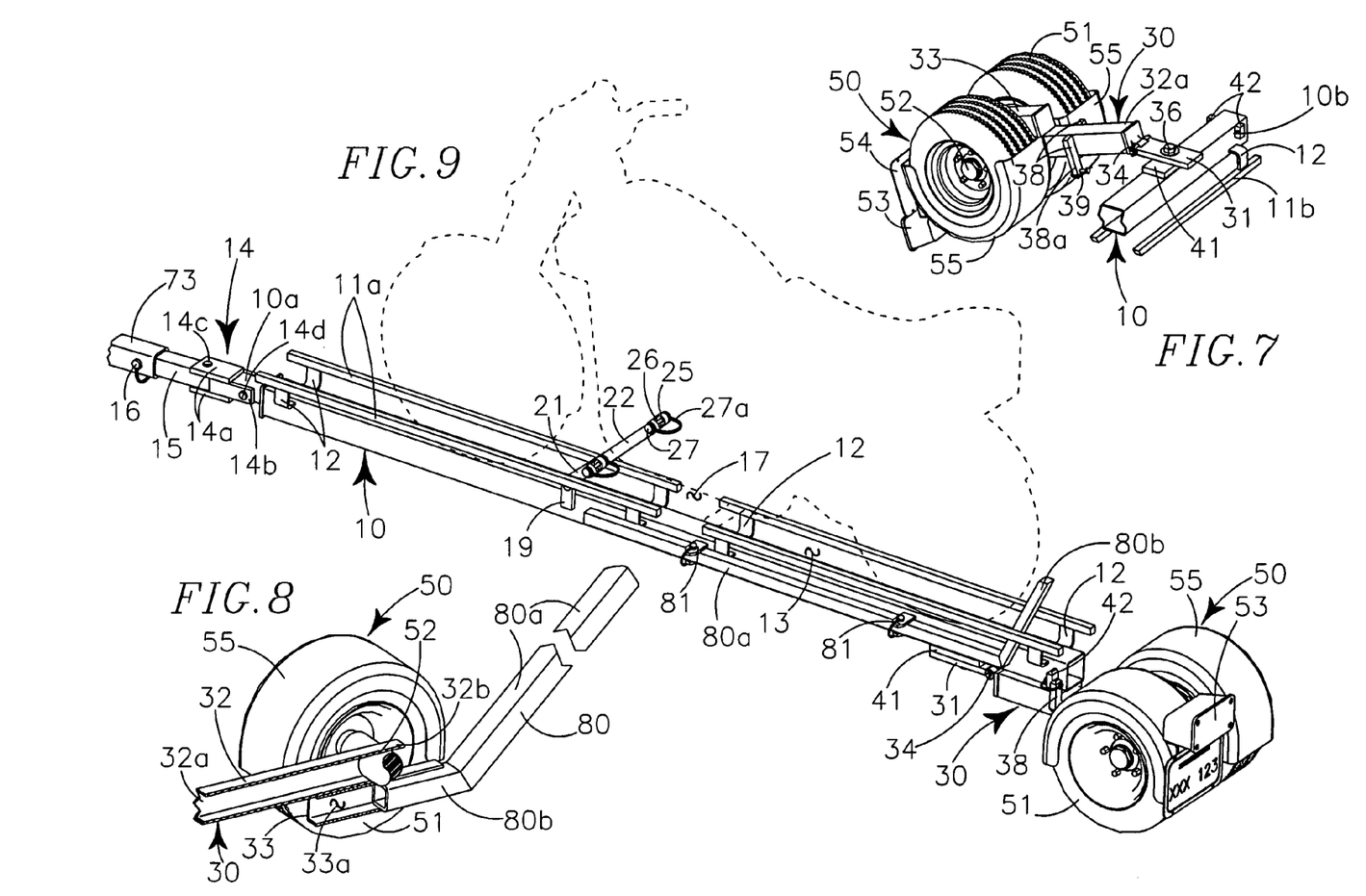
FIG. 7 is a bottom view of the pivoted swing arm and wheel truck of FIG. 6.
FIG. 8 is an isometric partial cutaway top and left side view of the swing arm and wheel truck showing the swing arm handle engaged with the swing arm handle sleeve.
FIG. 9 is an isometric top, rear and left side view of the trailer of FIG. 1.

The swing arm 30 (FIGS. 3, 7 and 8) is pivotally carried at the rearward end portion 10b of the main beam 10 and comprises, from front to rear respectively, a rotation plate 31, a horizontal tubular hinge 34, a box beam segment 32, a wheel truck 50 and a swing arm handle sleeve 33. A bolt type axle 36 extends through a medial hole (not shown) defined in the rotation plate 31 and a spacer plate 41 and threadably engages with an orifice (not shown) defined in the bottom of the rearward end portion 10b of the main beam 10. The bolt type axle 36 provides a vertical axis for pivotal rotational movement of the swing arm 30 relative to the main beam 10. The horizontal tubular hinge 34 is structurally attached to and pivotally interconnects the rotation plate 31 and the box beam segment 32, at a forward end portion thereof, so that the rotation plate 31 and the box beam 32 can pivot vertically relative to one another about a horizontal axis (FIG. 7). The spacer plate 41, between the rotation plate 31 and the main beam 10, provides a durable wear surface and additional clearance for rotation of the swing arm 30 relative to the main beam 10. A generally "H" shaped swing arm alignment bracket 38 (FIG. 5) is structurally carried by the box beam segment 32 spacedly rearward the horizontal tubular hinge 34 to carry and positionally maintain the rearward end portion 10b of the main beam 10 in axial alignment with the swing arm 30, which is the towing configuration. (FIG. 9).

The wheel truck 50 is structurally carried at a rearward end portion of the box beam segment 32 and has two spacedly adjacent parallel wheels 51 rotatable on a horizontal axle 52 extending therebetween. The wheel truck 50 and the wheels 51 thereof support the rearward end portion 10b of the main beam 10 above the supporting surface, such as a roadway, so that the trailer is towable by a towing vehicle (not shown). Wheel fenders 55, a license plate 54 and light fixtures 53 are also carried by the wheel truck 50 so that the trailer and support assembly is legal for use on streets and highways.

Figure 4:
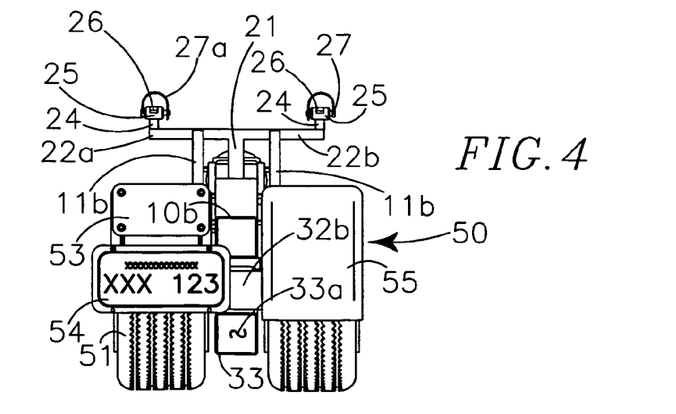
FIG. 4 is an orthographic rear view of the trailer of FIG. 2.

The swing arm handle sleeve 33 (FIGS. 4 and 8) is a box beam defining a medial channel 33a extending therethrough with a square orifice communicating therewith at a rearmost end. (FIG. 4). The swing arm handle sleeve 33 is structurally carried by the box beam segment 32 of the swing arm 30 below the horizontal axle 52 and between the wheels 51. An elongate angulated swing arm handle 80 (FIG. 8) having a short box beam leg 80b and structurally connected long box beam leg 80a is used to generate leverage to pivot the swing arm 30. The short leg 80b of the elongate swing arm handle 80 operatively engages with the medial channel 33a of the swing arm handle sleeve 33 through the square orifice. When an operator exerts pressure on the longer leg 80a, mechanical leverage is generated to raise and pivot the swing arm 30 for the loading and unloading of a motorcycle onto and off of the main beam 10.

The swing arm alignment bracket 38 (FIG. 5) is a generally "H" shaped member having two spaced apart vertical arms 38a, 38b and a medial horizontal crossmember 38c therebetween. The swing arm alignment bracket 38 straddles and is structurally attached to the box beam segment 32 spacedly rearward of the horizontal tubular hinge 34. The spaced apart vertical arms 38a, 38b that extend upwardly at each side of the box beam segment 32 define a space therebetween in which the rearward end portion 10b of the main beam 10 is carried when the trailer is in its towing configuration (FIG. 9). A locking bracket seat 42 is structurally carried on each side portion of the main beam 10 at a position where each locking bracket seat 42 is immediately adjacent forward the vertical arms 38a, 38b of the swing arm alignment bracket 38 when the swing arm 30 is in the towing configuration (FIG. 9). A locking pin 39 is removably carried in and extends through aligned holes 40, 43, defined in each vertical arm 38a, 38b and each locking bracket seed 42 respectively, to positionally secure the swing arm 30 in the towing configuration. (FIG. 9).

Figure 2:
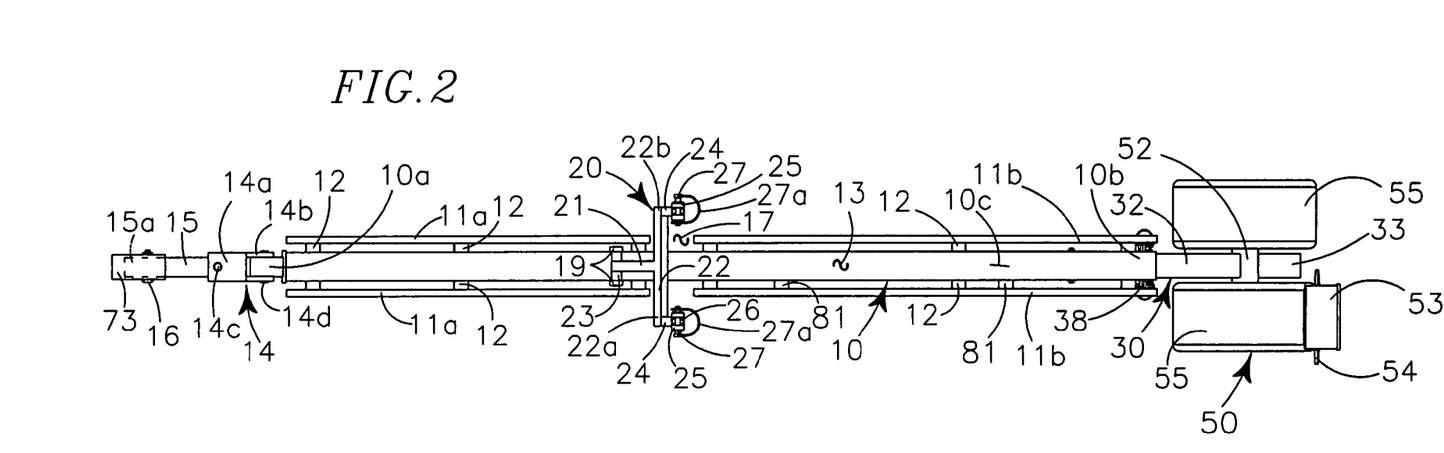
FIG. 2 is a plan view of the trailer of FIG. 1, less the motorcycle.

The "T" bar assembly 20 (FIGS. 2 and 14) has a box beam pivoting leg 21 with a first end portion and a second end portion structurally carrying a perpendicular crossbeam 22 at the second end portion thereof, a socket riser 24 at each opposing end portion 22a, 22b of the crossbeam 22, and a peg pin socket 25 carried by each socket riser 24 opposite the crossbeam 22. A tubular "T" bar axle sleeve 23 is structurally carried at the first end portion of the pivoting leg 21 opposite the crossbeam 22. The axle sleeve 23 defines a medial channel (not shown) extending therethrough and carries a bolt type axle 23a therein that extends through aligned holes (not shown) defined in axle brackets 19, structurally carried on opposing side portions of the main beam 10. The axle sleeve 23, the axle brackets 19 and the bolt type axle 23a extending therethrough pivotally connect the "T" bar assembly 20 to the main beam 10 and allows the "T" bar assembly 20 to pivot in an arc radially aligned with the main beam 10. (FIG. 13).

Figure 11:
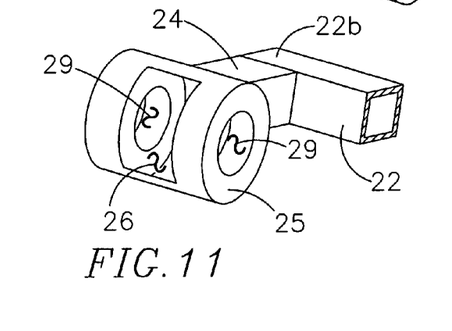
FIG. 11 is an enlarged isometric partial cutaway view of one peg pin socket structurally carried on a socket riser at one end portion of the crossbeam.

Each socket riser 24 (FIGS. 11 and 14) is a box beam segment structurally attached to the crossbeam 22 at opposing end portions 22a, 22b thereof opposite the pivoting leg 21. A peg pin socket 25 comprising a truncated cylinder defining in axial through hole 29 is structurally carried at an end portion of each socket riser 24 opposite the crossbeam 22. Each peg pin socket 25 further defines a radially extending cavity 26 opposite the socket riser 24 to operatively engage with and releasably carry an annulus 28a of a replacement foot peg pin 28 installed onto a motorcycle. A retaining pin 27 is removably carried in the hole 29 extending across and through the radially extending cavity 26.

Figures 10, 12:
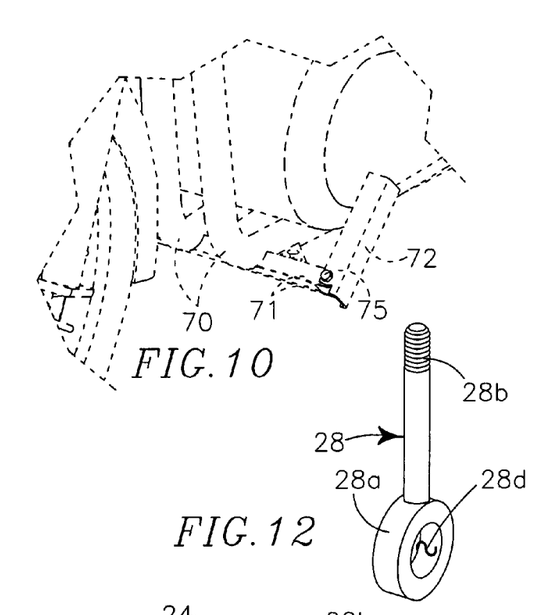
FIG. 10 is an enlarged isometric partial cutaway front and left side view of a motorcycle frame, a motorcycle foot peg in an upwardly pivoted position, foot peg fastening brackets and an original equipment bolt type connector for the motorcycle foot peg.
FIG. 12 is an enlarged isometric view of a replacement foot peg pin less a nut type fastener and lock washer.

A majority of motorcycles have an operator foot peg 72 on each opposing side of the motorcycle frame 70 (FIG. 10) upon which an operator positions a foot while riding. Commonly each foot peg 72 is pivotally attached to the motorcycle with a bolt type connector 75 extending through aligned holes (not shown) defined in an outer end portion of two spaced apart laterally extending fastening brackets 71 structurally carried by the motorcycle frame 70. A spring (not shown) may operatively communicate with the foot peg 72 and the fastening brackets 71 to bias the foot peg 72 into a laterally extended riding position. Use of the present invention requires the original equipment bolt type connector 75 be removed and replaced with a foot peg pin 28 (FIG. 12) that has an "eyebolt" configuration with an annulus 28a defining a medial hole 28d at a one end portion, and an opposing threaded end portion 28b.

Figure 13:
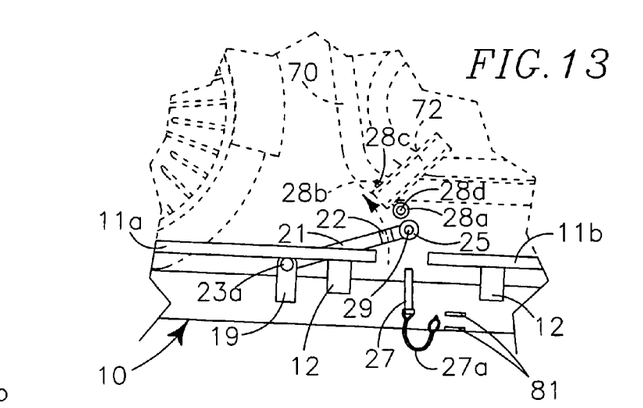
FIG. 13 is a partial cutaway orthographic left side view of the main beam, "T" bar assembly, and motorcycle carrying a replacement foot peg pin showing the pivotal motion of the "T" bar assembly for installation of the retaining pin.
Figure 14:
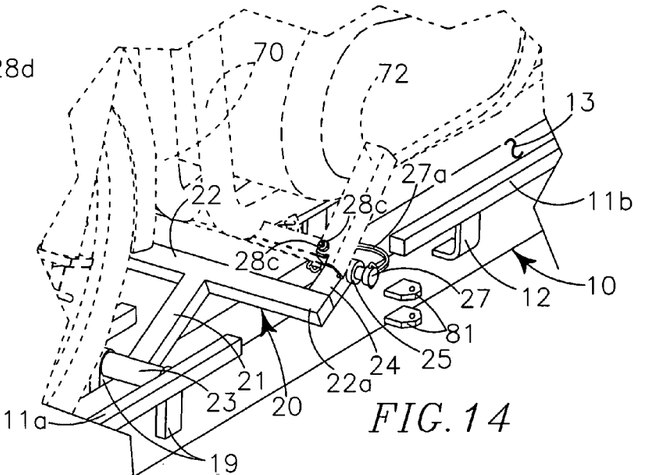
FIG. 14 is an enlarged isometric partial cutaway front and left side view of the "T" bar assembly and the main beam showing a retaining pin installed in the peg pin socket securing a motorcycle to the "T" bar assembly and the trailer.

The replacement foot peg pin 28 is installed through the foot peg fastening brackets 71 and foot peg 72 from the bottom so that the annulus 28a is below the bottom fastening bracket 71 (FIG. 13). A nut type fastener 28c is threaded onto the threaded end portion 28b to secure the replacement foot peg pin 28 and foot peg 72 to the fastening brackets 71. The biasing spring (not shown), if any, is reinstalled to bias of the foot peg 72 into the laterally extended riding position.

The radially extending cavity 26 defined in each peg pin socket 25 (FIG. 11) is sized, aligned and configured to releasably engage with and securely carry the annulus 28a of a replacement foot bag and 28 while aligning holds 29 and 28d. The alignment of holes 29 and 28d permits the retaining pin 27 to extend simultaneously therethrough securing the motorcycle to the T-bar assembly 20 which responsively prevents undesirable movement of the motorcycle on the trailer.

Plural swing arm handle storage brackets 81 are structurally carried on an elongate side portion of the main beam 10 below the rearward side rails 11b. Each storage bracket 81 comprises two parallel spaced apart rectilinear plates structurally attached to a side portion of the main beam 10 at an adjacent edge. Each storage bracket 81 defines a hole (not shown) therein to carry a removable retaining pin 81a extending therethrough. The elongate leg 80a of the swing arm handle 80 is carried in the space between the spaced apart plates 81 and is positionally maintained therein by the retaining pins 81a extending through the holes (not shown) defined in the plates 81 and also through cooperating holes (not shown) defined in the elongate leg 80a of the swing arm handle 80.

Having described the structure of my mono-beam motorcycle trailer and support assembly, its assembly and operation may be understood.

As noted previously, a majority of motorcycles have an operator foot peg 72 on each opposing side of the motorcycle upon which the operator positions a foot while riding. Commonly each foot peg 72 is pivotally attached to the motorcycle with a bolt type connector 75 that is journaled by two spaced apart laterally extending fastening brackets 71. The original bolt type connector 75 for each foot peg 72 is removed and is replaced with a replacement foot peg pin 28 that is installed from the bottom so that the annulus 28a is below the lowermost fastening bracket 71. The annulus 28a is aligned so that the axis of the hole 28d is perpendicular to the elongate length of the motorcycle. A nut type fastener 28c, preferably in combination with a locking washer (not shown), is fastened to the threaded end portion 28b to secure the replacement foot peg pin 28 and foot peg 72 to the fastening brackets 71.

The trailer is positioned behind the towing vehicle (not shown) with the receiver tongue 15 adjacent the receiver hitch 73. The forward end portion 15a of the box beam receiver tongue 15 is inserted into the box beam medial channel (not shown) of the receiver hitch 73 and the holes (not shown) defined therein are aligned. The securing pin 16 is inserted through the aligned holes (not shown) to secure the receiver tongue 15 to the towing vehicle (not shown). Electrical connections (not shown) operatively communicating between the towing vehicle (not shown) and the trailer to power the light fixtures 53 are connected.

Locking pins 39 are removed from the aligned holes 40, 43 defined in the vertical arms 38a, 38b of the swing arm alignment bracket 38 and the locking bracket seats 42 respectively so that the swing arm 30 may be pivoted as desired.

The swing arm handle 80 is used to pivot the swing arm 30 to a position laterally adjacent the main beam 10 to ease the loading and unloading of a motorcycle thereon. The end of the short box beam leg 80b, opposite the elongate leg 80a, is inserted into the medial channel 33a of the swing arm handle sleeve 33 through its square orifice. The box beam configuration of the swing arm handle sleeve 33 and the short box beam leg 80b prevent axial rotation therebetween. The operator exerts downward pressure on the elongate leg 80a which responsively levers the rearward end portion 10b of the main beam 10 above the swing arm 30 and causing the swing arm 30 to disengage from the swing arm alignment bracket 38 carried by the box beam segment 32 as the swing arm 30 and the main beam 10 pivot elevationally relative to one another on the tubular hinge 34.

Figures 5, 6:
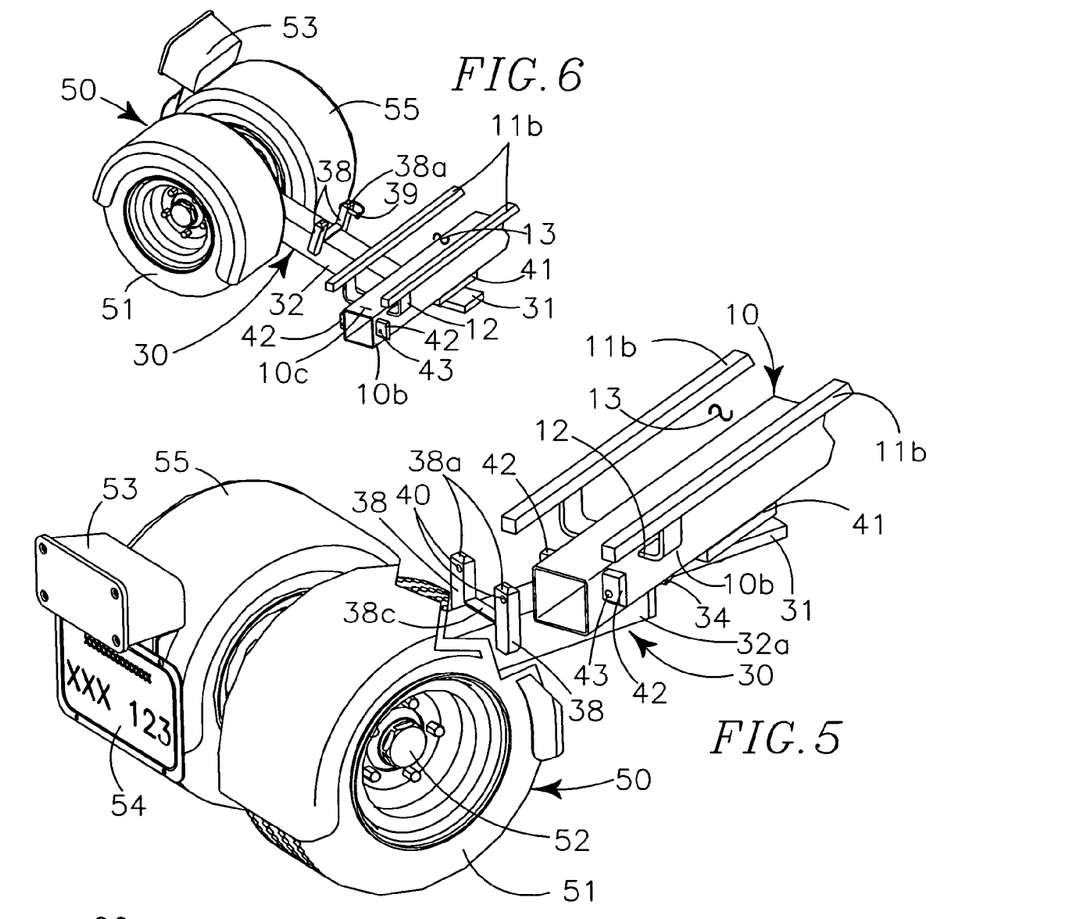
FIG. 5 is an enlarged isometric partial cutaway top and right side view of the rearward end portion of the trailer showing the swing arm and wheel truck partially pivoted to the left of the main beam.
FIG. 6 is an isometric partial cutaway top and right side view of the rearward end portion of the trailer showing the swing arm and wheel truck pivoted to the left of the main beam to a position where a motorcycle may be loaded onto, or unloaded from, the main beam without having to pass over the wheel truck.

After the swing arm 30 is disengaged vertically from the swing arm alignment bracket 38, the operator exerts lateral pressure on the elongate leg 80a to pivot the swing arm 30, either left or right, about the bolt type vertical axle 36 so that the swing arm 30 and wheel truck 50 are pivoted to a position laterally adjacent the main beam 10. (FIG. 6). The operator releases pressure on the swing arm handle 80 allowing the rearward end portion 10b of the main beam 10 to rest upon the supporting surface permitting a motorcycle to be loaded or unloaded from the main beam 10 without requiring the motorcycle to pass over the swing arm 30 and wheel truck 50. The mechanical leverage supplied by the swing arm handle 80 is generally sufficient to overcome any skidding or friction between the tires 51 and the supporting surface as the swing arm 30 is pivoted laterally.

A motorcycle carrying previously installed replacement foot peg pins 28 is moved onto the main beam 10 from the rearward end portion 10b that is resting upon the supporting surface. When properly loaded, the motorcycle wheels and tires rest upon the top surface 10c of the main beam 10 in the channel 13 between the side rails 11, and the "T" bar assembly 20 is adjacent under the foot pegs 72. The "T" bar assembly 20 is pivoted upwardly (FIG. 13), and the position of the motorcycle adjusted, so that each annulus 28a is positioned within the radially extending cavity 26 of each peg pin socket 25 and the holes 28d, 29 defined thereby respectively are aligned. The retaining pin 27 is inserted through the aligned holes 28d, 29 and is secured in place with known means, such as a spring loop 27a or a cotter pin (not shown). The process for installing a second similar retaining pin 27 in the aligned holes 29, 28d on the opposite side of the motorcycle is the same as described immediately above.

The process of lifting the rearward end portion 10b of the main beam 10 and pivoting the swing arm 30 into the towing configuration so that the rearward end portion 10b of the main beam 10 is elongately aligned with the swing arm 30 is substantially the reverse of the lifting and pivoting process described above. After the swing arm 30 has been pivoted into the towing configuration (FIG. 9), the position locking pins 39 are reinstalled through the aligned locking pin holes 40 43 defined in the vertical arms 38a, 38b of the swing arm alignment bracket 38 and locking bracket seats 42. The position locking pins 39 are secured in place with known means, such as a spring loop 39a or a cotter pin (not shown). The short leg 80b of the elongate swing arm handle 80 is disengaged from the medial channel 33a of the swing arm handle sleeve 33 and the swing arm handle 80 is thereafter placed in the swing arm handle storage brackets 81 on the side portion of the main beam 10 for storage and the retaining pins 81a are installed to positionally maintain the swing arm handle 80 therein.

The process of unloading the motorcycle from the main beam 10 of the trailer 9 is generally the reverse of the loading process described in detail above.

The foregoing description of my invention is necessarily of a detailed nature so that a specific embodiment of a best mode may be set forth as is required, but it is to be understood that various modifications of details, and rearrangement, substitution and multiplication of parts may be resorted to without departing from its spirit, essence or scope.

Having thusly described my invention, what I desire to protect by Letters Patent, and what I claim is:

1. A mono beam trailer and support assembly for transport of an upright motorcycle behind a vehicle having a box beam receiver hitch extending rearwardly therefrom, the motorcycle having foot peg mounting brackets defining a hole at each opposing side portion, the mono beam trailer and support assembly comprising in combination:

at least one foot peg pin for installation in the hole defined in the foot peg mounting brackets, the at least one foot peg pin having an annulus defining a hole therethrough at one end portion and an opposing threaded end portion, for engagement with a releasable connector, the foot peg pin installed on the foot peg mounting brackets so that the annulus depends below the foot peg mounting brackets;

an elongate main beam box beam having a forward end portion and a rearward end portion with a universal joint at the forward end portion that pivotally interconnects the elongate main beam to a box beam receiver tongue that operatively engages with the box beam receiver hitch of the towing vehicle;

a swing arm pivotally carried at the rearward end portion of the elongate main beam box beam, the swing arm having a forward end portion and a rearward end portion, and a wheel truck at the rearward end portion of the swing arm to support the rearward end portion of the elongate main beam box beam and pivotally connected swing arm above a supporting surface;

a "T" bar assembly pivotally carried by the elongate main beam box beam between the universal joint and the swing arm, the "T" bar assembly having, a leg with a first end portion and a second end portion pivotally connected to the elongate main beam box beam at the first end portion and carrying a perpendicular crossbeam at the second end portion, the perpendicular crossbeam having laterally extending opposed end portions;

a socket riser at each opposing end portion of the perpendicular crossbeam opposite the pivoting leg and a peg pin socket carried by each socket riser opposite the perpendicular crossbeam, each peg pin socket defining an axial through hole and a radially extending cavity communicating with the axial through hole therein opposite the socket, and a releasable securing pin that extends simultaneously through the axial through hole, the radially extending cavity defined in each peg pin socket and the hole defined by the annulus of the at least one foot peg pin when the at least one foot peg pin is operatively engaged with and carried within the radially extending cavity of the peg pin socket.

2. The trailer and support assembly of claim 1 further comprising:

a box beam swing arm handle sleeve defining a medial channel having a square orifice at a rearward end, structurally carried by the pivoting swing arm adjacent below the wheel truck; and an elongate swing arm handle to operatively engage with the medial channel of the swing arm handle sleeve to optionally provide mechanical leverage to pivot the swing arm and wheel truck relative to the elongate main beam box beam.

3. The trailer and support assembly of claim 1 further comprising:
a swing arm alignment bracket structurally carried by the swing arm and defining at least one through hole for releasable engagement with a locking pin;
at least one locking bracket seat structurally carried at the rearward end portion of the elongate main beam box beam adjacent above the swing arm, the locking bracket seat defining at least one through hole axially aligned with the at least one through hole defined in the swing arm alignment bracket; and
a locking pin for releasable simultaneous engagement with the through holes defined in the swing arm alignment bracket and the locking bracket seat to positionally secure the swing arm relative to the elongate main beam box beam.

4. The trailer and support assembly of claim 1 further comprising:
side rails structurally carried by plural side rail supports spacedly adjacent laterally and spacedly above the elongate main beam box beam to form a channel therebetween above the elongate main beam box beam.

5. The trailer and support assembly of claim 1 wherein:
the universal joint, pivotally connecting the forward end portion of the elongate main beam box beam to the box beam receiver tongue, has a forward yoke and an opposing rearward yoke perpendicularly to the forward yoke, each yoke having two parallel spaced apart plate members structurally attached to the adjacent opposing spaced apart plate members of the opposing yoke at adjacent overlapping edge portions, each spaced apart plate member defining a hole in an end portion opposite the overlapping portion to journal an axle extending through and between the spaced apart plate members;
the box beam receiver tongue has a forward end portion and a rearward end portion defining a through hole to carry an axle journaled by one yoke of the universal joint;
the forward end portion of the elongate main beam box beam defines a through hole that carries an axle journaled by one yoke of the universal joint; and
the axles journaled by the yokes are perpendicular, relative to one another.

6. The trailer and support assembly of claim 1 wherein:
a hinge pivotally interconnects the forward end portion of the swing arm to a rotation plate defining a medial through hole;
a vertical axle extending through the hole defined in the rotation plate and engaged with the rearward end portion of the elongate main beam box beam; and
the hinge and the vertical axle permit the swing arm to pivot in mutually perpendicular directions relative to the elongate main beam box beam.

7. A mono beam trailer and support assembly for transport of an upright motorcycle behind a vehicle having a box beam receiver hitch extending rearwardly therefrom, the motorcycle having foot peg mounting brackets defining a hole at each opposing side portion, the mono beam trailer and support assembly comprising in combination:
at least one foot peg pin for installation in the hole defined in the foot peg mounting brackets, the at least one foot peg pin having an annulus defining a hole therethrough at one end portion and an opposing threaded end portion for engagement with a releasable connector, the foot peg pin installed on the foot bag mounting brackets so that the annulus depends below the foot peg mounting brackets;
an elongate main beam box beam having a forward end portion and a rearward end portion,
side rails structurally carried by plural side rail supports spacedly adjacent laterally and spacedly above the elongate main beam box beam forming a channel therebetween,
a universal joint at the forward end portion that pivotally interconnects the elongate main beam box beam to a box beam receiver tongue that operatively engages with the box beam receiver hitch of the towing vehicle,
the universal joint having a forward yoke and an opposing rearward yoke perpendicular to the forward yoke, each yoke having two parallel spaced apart plate members structurally attached to the opposing parallel spaced apart plate members of the opposing yoke at adjacent overlapping edge portions, each spaced apart plate member defining a hole in an end portion opposite the overlapping portion to journal an axle extending through and between the spaced apart plate members, the axles perpendicular relative to one another;
a swing arm pivotally carried at the rearward end portion of the elongate main beam box beam, the swing arm having a forward end and a rearward end portion,
a rotation plate defining a medial hole pivotally connected to the rearward end portion of the elongate main beam box beam,
a horizontal tubular hinge interconnecting the rotation plate to the forward end portion of the swing arm,
a wheel truck structurally carried at the rearward end portion of the swing arm to allow towable movement of the mono beam trailer and support assembly,
a box beam swing arm handle sleeve defining a medial channel therethrough and having a square orifice at a rearward end structurally carried by the rearward end portion of the swing arm adjacent below the wheel truck;
a swing arm alignment bracket structurally carried by the swing arm, the swing arm alignment bracket defining at least one through hole for releasable engagement with a locking pin;
at least one locking bracket seat structurally carried at the rearward end portion of the elongate main beam box beam adjacent above the swing arm, the locking bracket seat defining a through hole axially aligned with the at least one through hole defined in the swing arm alignment bracket, and
a locking pin for releasable simultaneous engagement with the through holes defined in the swing arm alignment bracket and the locking bracket seat to positionally secure the swing arm relative to the elongate main beam box beam;
a "T" bar assembly pivotally carried by the elongate main beam box beam between the universal joint and the swing arm, the "T" bar assembly having,
a leg with the first end portion and a second end portion pivotally connected at the first end portion to the elongate main beam box beam with a horizontal axle so that the pivoting leg is movable in an arc aligned with the elongate main beam box beam,
a perpendicular crossbeam carried by the leg at the second end portion opposite the elongate main beam box beam, the perpendicular crossbeam having laterally extending opposing end portions, and a socket riser at each opposing end portion of the perpendicular crossbeam opposite the pivoting leg, a peg pin socket carried by each socket riser opposite the perpendicular crossbeam, each peg pin socket defining an axial through hole and a radially extending cavity communicating with the axial through hole therein opposite the socket riser, and a releasable securing pin that extends simultaneously through the axial through hole, radially extending cavity in each peg pin socket and the hole defined by the annulus of the at least one foot peg pin when the at least one foot peg pin and is operatively engaged with the radially extending cavity of the peg pin socket; and an elongate swing arm handle to operatively engage with the medial channel of the swing arm handle sleeve to optionally provide mechanical leverage to pivot the swing arm and wheel truck vertically and a laterally relative to the elongate main beam box beam.

* * * * *